(No Model.)

E. B. WILDER.
FAUCET.

No. 444,323.   Patented Jan. 6, 1891.

Witnesses.
Walter P. Keene.
Walter Donaldson

Inventor.
Edward B. Wilder,
by Ellis Spear
Atty.

UNITED STATES PATENT OFFICE.

EDWARD B. WILDER, OF ST. LOUIS, MISSOURI.

FAUCET.

SPECIFICATION forming part of Letters Patent No. 444,323, dated January 6, 1891.

Application filed January 23, 1890. Serial No. 337,808. (No model.)

*To all whom it may concern:*

Be it known that I, EDWARD B. WILDER, of St. Louis, in the State of Missouri, have invented a new and useful Improvement in Faucets; and I do hereby declare that the following is a full, clear, and exact description of the same.

My invention relates to faucets; and its object is to provide a very simple construction of parts with an interposed diaphragm of flexible material containing the ports for the fluid, one of the parts being adapted to be moved to bring these ports into alignment with the exit-opening, the faucet thus being composed practically of but three parts, and by reason of their relative arrangement of the flexible diaphragm with the stem of the discharge part of the faucet all leakage is prevented, and the pressure of the fluid is utilized to make a tight connection between the diaphragm and the part against which its under face bears.

My invention consists of a discharge tube or nozzle provided with an exit-opening, a coupling for connecting the nozzle to the water-pipe, (though this coupling may represent the end of the pipe itself,) and an interposed disk of flexible material provided with ports for the passage of the fluid, said ports registering with the opening in the nozzle in one position; but by the turning of the parts in one direction or the other the openings are moved out of line and the pressure of the fluid against the flexible disk forces it so closely against the bearing formed around the exit-opening that all leakage is prevented.

The invention further consists in a nozzle and coupling, said coupling being secured to the nozzle by pins passing through the lower ends of the coupling and engaging with an annular internal depression in the end of the nozzle, with the flexible disk interposed between the coupling and the nozzle, provided with ports for the passage of the fluid, the connection between the coupling and the nozzle being in the nature of a swivel, allowing the parts to be moved to provide for the discharge of fluid contents.

Figure 1:
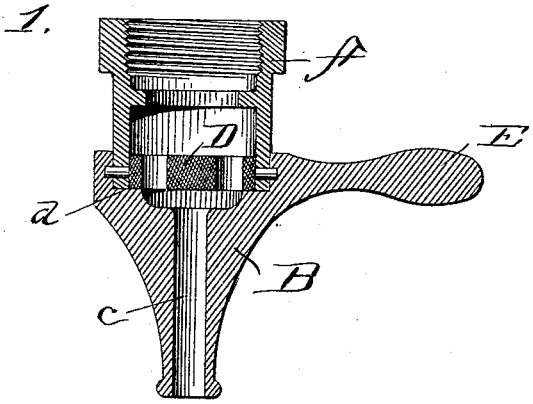
Figure 2:
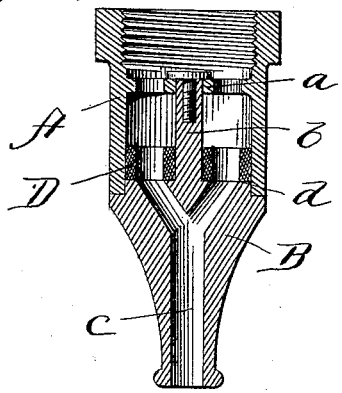
Figure 3:
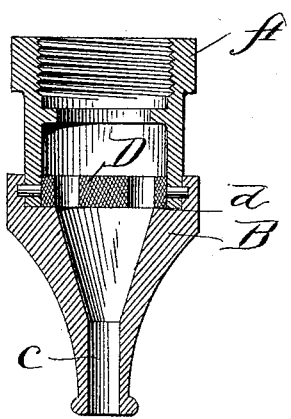

In the accompanying drawings, Figure 1 is a sectional view through the coupling and nozzle and diaphragm. Fig. 2 is a like section showing a modification of the means for holding the coupling and nozzle together. Fig. 3 is a modification of the nozzle, showing a different form of exit-passage from that shown in Fig. 1.

In the drawings, A represents a coupling screw-threaded internally for connection with the end of the pipe to which the faucet is to be attached, or it may represent the end of the pipe itself, to which the nozzle may be directly attached. The nozzle may have a tapering tip, according to the requirements of its location, or may be of any other suitable form. It is represented at B, and is connected to the coupling A, as shown in Fig. 1, by means of pins passing through perforations in the lower edge of the coupling, their outer ends extending into an annular groove formed in the upper flange of the part B, thus making a swivel-connection for the turning on or off of the flow. Instead of this form of connection, I may, as in Fig. 2, form with the nozzle a projecting spindle adapted to be connected to a cross-bar *a* in the coupling, the lower end of the coupling fitting snugly in a recess in the outer upper edge of the nozzle. The spindle (shown at *b*) passes through an opening in the cross-bar, and a headed screw is secured to the end of the spindle, thus providing a swivel-connection operating in substantially the same manner as the construction shown in Fig. 1.

The nozzle is provided with a central exit-opening *c*, which is, as shown in Fig. 1, enlarged laterally, forming a depression in the upper end of the part B, which is in connection with the central opening. Instead of being formed in this way, two openings may be provided, as shown in Fig. 2, extending from the upper face of the part B inwardly at an angle to the central opening, or, as in Fig. 3, the central opening or passage may terminate in an elongated opening, contracting gradually downwardly until it is merged into the central opening.

Whatever may be the form of opening in the nozzle, a bearing *d* is formed upon either side of the elongated opening or depression, for a purpose which will now be described.

As shown in Fig. 1, the disk or diaphragm D is inserted in the end of the coupling A.

This disk or diaphragm being of rubber or other flexible material and in the position shown in this figure, it fills the entire end of the coupling, being of such size as to fit it snugly, and prevents the displacement of the pins forming the connection between the coupling and the nozzle. The diaphragm is perforated with two holes diametrically opposite, and the distance between the holes about equals the length of the elongated opening in the part B. When the nozzle, which is provided with a suitable handle E, is turned so as to cause the elongated opening to register with the perforations in the diaphragm the water flows freely; but the supply will be limited should the openings not fully register, and the size of the stream may be regulated by the movement of the handle. When the elongated opening is turned so as to be out of alignment with the perforations in the diaphragm, no water will be discharged and there will be no leakage, for the reason that the pressure of the water will force the flexible diaphragm closely against the plane surface of the part B upon either side of the elongated opening, and the greater the pressure the more perfect will be the contact. Again, as the diaphragm is interposed not only between the coupling and the discharge-opening, but also between the coupling and the joint formed by the connection of the nozzle therewith, there can be no objectionable leakage, as is now the case at the junction of two parts in the faucets in common use.

While I have shown a faucet embodying the invention, it will be understood that the same idea may be applied to the nozzle of an ordinary hose, and in that case a handle will not be necessary, as the nozzle itself may be grasped by hand and may be operated to turn on or cut off the water. It will also be seen that as the diaphragm is not held except by friction the wear caused by contact with the face against which it bears is taken up by the pressure of the water in rear thereof.

I claim as my invention—

1. In combination, the part A, having an unobstructed interior and an open end, a nozzle seated against the end of part A, a swiveled connection between the part A and the nozzle B, and the perforated disk D, fitted to the open end of the part A and resting against the inner end of the nozzle, the said disk being exposed to the pressure of water in the part A, and thereby kept constantly forced against the nozzle, substantially as described.

2. In combination with the nozzle, a coupling having a swivel connection, an exit-passage terminating at its upper end in an elongated opening, and a flexible diaphragm having passages adapted to register with said exit-passage, substantially as described.

3. In combination with the nozzle having an exit-opening, a coupling, a swivel connection between the coupling and nozzle, consisting of pins in one part fitting an annular groove in the other, and a flexible diaphragm having openings therethrough, located in the end of the coupling and adapted to bear against the inner ends of the holding-pins, substantially as described.

In testimony whereof I have signed my name to this specification in the presence of two subscribing witnesses.

EDWARD B. WILDER.

Witnesses:
 HARRY C. LADD,
 W. B. HOMER.